US012331800B2

(12) United States Patent
Thomas et al.

(10) Patent No.: US 12,331,800 B2
(45) Date of Patent: Jun. 17, 2025

(54) DISC BRAKE

(71) Applicant: Meritor Heavy Vehicle Braking Systems (UK) Limited, Cwmbran Gwent (GB)

(72) Inventors: Paul Thomas, Cwmbran Gwent (GB); Sean Cleary, Cwmbran Gwent (GB); Martin Taylor, Cwmbran Gwent (GB); Hywel Woodward, Cwmbran Gwent (GB); Timothy Smith, Cwmbran Gwent (GB); Simon Duggan, Cwmbran Gwent (GB); Alex Szafnauer, Cwmbran Gwent (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 368 days.

(21) Appl. No.: 17/686,841

(22) Filed: Mar. 4, 2022

(65) Prior Publication Data

US 2022/0299072 A1 Sep. 22, 2022

(30) Foreign Application Priority Data

Mar. 22, 2021 (EP) .................................... 21164065
Mar. 22, 2021 (EP) .................................... 21164067
(Continued)

(51) Int. Cl.
*F16D 55/227* (2006.01)
*B60T 1/06* (2006.01)
(Continued)

(52) U.S. Cl.
CPC ............ *F16D 55/227* (2013.01); *B60T 1/065* (2013.01); *B60T 13/741* (2013.01);
(Continued)

(58) Field of Classification Search
CPC ............... F16D 55/226; F16D 55/2265; F16D 55/22655; F16D 55/227; F16D 65/18;
(Continued)

(56) References Cited

U.S. PATENT DOCUMENTS 5,161,648 A * 11/1992 Taig ...................... F16D 55/227
188/71.9
5,749,445 A * 5/1998 Ruiz Busquets . F16D 55/22655
188/73.44
(Continued)

FOREIGN PATENT DOCUMENTS

CN 111173859 A 5/2020
CN 108730373 B * 12/2021 ............. F16D 55/22
DE 4119928 A1 12/1992

OTHER PUBLICATIONS

CN111173859A (Year: 2020).*
(Continued)

*Primary Examiner* — Thomas J Williams
(74) *Attorney, Agent, or Firm* — Dickinson Wright PLLC

(57) ABSTRACT

A disc brake assembly that includes first and second brake pads for contacting a rotor, a brake carrier for receiving at least the first brake pad, a brake caliper arranged to slide with respect to the brake carrier, and an actuating arrangement. The actuating arrangement is configured to selectively move the brake caliper and is electrically operated.

20 Claims, 5 Drawing Sheets

(30) Foreign Application Priority Data

Mar. 22, 2021 (GB) ...................................... 2103978
Jun. 8, 2021 (EP) ...................................... 21178265

(51) Int. Cl.
| | |
|---|---|
| *B60T 13/74* | (2006.01) |
| *F16D 55/2265* | (2006.01) |
| *F16D 65/18* | (2006.01) |
| *F16D 65/22* | (2006.01) |
| *F16D 65/64* | (2006.01) |
| *F16D 65/66* | (2006.01) |
| *F16D 55/00* | (2006.01) |
| *F16D 121/20* | (2012.01) |
| *F16D 125/40* | (2012.01) |
| *F16D 127/02* | (2012.01) |

(52) U.S. Cl.
CPC ....... *F16D 55/22655* (2013.01); *F16D 65/18* (2013.01); *F16D 65/22* (2013.01); *F16D 65/64* (2013.01); *F16D 65/66* (2013.01); *F16D 2055/0029* (2013.01); *F16D 2121/20* (2013.01); *F16D 2125/40* (2013.01); *F16D 2127/02* (2013.01)

(58) Field of Classification Search
CPC .. F16D 65/64; F16D 65/66; F16D 2055/0029; F16D 2065/386; F16D 2121/20; F16D 2125/40; F16D 2127/02
See application file for complete search history.

(56) References Cited

U.S. PATENT DOCUMENTS

| | | | |
|---|---|---|---|
| 7,484,601 B2* | 2/2009 | Baumann | .............. F16D 65/568 |
| | | | 188/71.9 |
| 9,758,134 B2* | 9/2017 | Yokoyama | .......... F16D 55/2265 |
| 2015/0107943 A1 | 4/2015 | Yokoyama et al. | |
| 2022/0299072 A1* | 9/2022 | Thomas | ................ F16D 55/227 |

OTHER PUBLICATIONS

CN108730373B (Year: 2021).*
Extended European Search Report dated Nov. 15, 2021 for related application No. 21178265.1: 6 Pages.

* cited by examiner

DISC BRAKE

TECHNICAL FIELD

The present invention relates to a disc brake assembly for a heavy commercial vehicle.

BACKGROUND

Disc brakes are commonly used for braking heavy vehicles such as trucks, buses, and coaches. Heavy vehicle disc brakes typically include a brake carrier, a brake caliper, and a brake rotor. The brake carrier is arranged to carry brake pads on each side of the brake rotor. The brake caliper is mounted on the brake carrier and slidably supported by at least one guide assembly, such that, when the disc brake is actuated, the brake caliper is able to slide with respect to the brake carrier. As the brake caliper slides inboard, the brake pads are urged onto the opposing faces of the rotor in a clamping action and a braking action is achieved.

When the disc brake is not actuated, a running clearance is provided between the brake pads and the rotor, so that the rotor can move freely. However, the brake pads are able to move into contact with the rotor when the disc brake is not actuated. In particular, following application of the disc brake, the brake pads are not moved away from the rotor, so that the brake pads may remain in contact with the rotor. Contact of the brake pads with the rotor can also be caused by e.g., vibration, such as engine vibration or vibration due to uneven road surface, forces as a result of the vehicle moving around a corner, and the like.

Unwanted contact of the brake pads with the rotor between brake applications can cause unnecessary brake pad wear (leading to a reduction in the life of the brake pad), rotor wear, drag, lower vehicle efficiency and higher fuel consumption.

It is known to retract the brake pads to address such unwanted contact. However, even with retraction of the brake pads, the slidable caliper can be moved during vibration or cornering of the vehicle so that the brake pads are moved into contact with the rotor.

When the disc brake is not actuated, it is desirable for the brake pads to be located equidistant from the rotor, in order to promote even wear of the brake pads and the rotor over the life of the disc brake.

Existing systems for positive pad retraction can help to ensure that the brake pads are pushed away from the rotor after a braking operation. However, such systems are typically located in an intermediate position between the inboard and the outboard brake pads so cannot account for differential brake pad and rotor wear, when the inboard and outboard brake pads, and opposing surfaces of the rotor, wear at different rates. Such positive pad retraction systems also are difficult to align and locate, due to, for example, machining tolerances.

The present teachings seek to overcome or at least mitigate the problems of the prior art.

SUMMARY

A first aspect of the present teachings provides a disc brake assembly for a heavy commercial vehicle, the disc brake assembly comprising first and second brake pads for contacting a rotor during a braking operation to slow the vehicle, the rotor having a central axis defining an inboard-outboard axial direction; a brake carrier for receiving at least the first brake pad; a brake caliper arranged to slide with respect to the brake carrier in the axial direction for clamping and release of the rotor by the brake pads; and an actuating arrangement configured to selectively move the brake caliper in the outboard axial direction in relation to the brake carrier; wherein the actuating arrangement is electrically operated.

Upon release of the disc brake, the actuating arrangement can be used to move the brake caliper in an outboard direction in relation to the brake carrier, so that movement of the outboard brake pad in the outboard direction, i.e., away from the rotor, is not inhibited by the brake caliper. Advantageously, clearance between the outboard brake pad and the rotor is more easily achieved, reducing drag. Electric operation of the actuating arrangement allows movement of the brake caliper to be controlled, and swift operation of the actuating arrangement.

In exemplary embodiments, the actuating arrangement is configured to move the brake caliper by a predetermined distance.

The brake caliper being movable outboard by a predetermined distance allows running clearance to be controlled.

In exemplary embodiments, when no braking operation is taking place, the disc brake assembly has a total potential running clearance between each of the first and second brake pads and the rotor; and wherein the predetermined distance is related to the total potential running clearance.

Basing the predetermined distance upon the total potential running clearance between the brake pads and the rotor means that the running clearance can be optimized as desired.

In exemplary embodiments, the predetermined distance is substantially half of the total potential running clearance.

The predetermined distance being substantially half of the total potential running clearance allows running clearance to be evenly distributed either side of the rotor.

In exemplary embodiments, the actuating arrangement comprises a first portion secured to the brake caliper, and a second portion secured to the brake carrier, and wherein the actuating arrangement is configured to move the first and second portions in relation to one another so as to effect movement of the brake caliper in relation to the brake carrier.

The actuating arrangement having first and second portions secured respectively to the brake caliper and the brake carrier provides and simple and effective means of controlling movement between the brake caliper and the brake carrier.

In exemplary embodiments, the disc brake assembly further comprises a first caliper guide assembly configured to slidably support the brake caliper on the brake carrier; wherein the caliper guide assembly comprises a first guide pin secured to the brake carrier and a first guide bore defined by the brake caliper and configured to slidably receive the first guide pin; and wherein the second portion is secured to the first guide pin.

The guide pin provides a suitable location for the attachment of the actuating arrangement, as there is space available at the guide pin that is not available elsewhere in the compact disc brake assembly. In addition, securing the actuating arrangement to the guide pin allows the actuating arrangement to be automatically adjusted for wear as the relative positions of the brake caliper and the brake carrier are adjusted for wear, i.e., as the depth of friction material on each brake pad is reduced during use.

In exemplary embodiments, the first guide pin comprises a guide sleeve for slidably supporting the brake caliper, and a fastener for securing the guide sleeve to the brake carrier, wherein the second portion is secured to the guide sleeve.

In exemplary embodiments, the second portion is secured to the fastener.

The guide sleeve and the fastener by which the guide sleeve is secured to the brake carrier each provide a suitable location of the guide pin for the second portion.

In exemplary embodiments, the first portion extends at least partially within the first guide bore.

The first portion extending within the first guide bore saves space, providing a compact arrangement.

In exemplary embodiments, the first portion is secured to the first guide bore by a push-fit arrangement.

Securing the first portion to the first guide bore with a push-fit arrangement is simple, effective and avoids the use of additional components.

In exemplary embodiments, the first caliper guide assembly further comprises a cap for closing an opening of the first guide bore; and wherein the cap comprises the first portion.

The cap protects the first guide assembly from contamination. Incorporating the first portion with the cap is a compact means of covering the first guide bore and so protecting against contamination.

In exemplary embodiments, the actuating arrangement has an inactive state and an active state; wherein, when the actuating arrangement is in the active state, the first and second portions are urged towards a first, relatively close, position to one another, and the brake caliper is urged towards a relatively outboard position; wherein the actuating arrangement comprises a solenoid configured to move the first and second portions to the first, relatively close, position; and wherein, when the actuating arrangement is in the active state, the solenoid is activated, so as to urge the first and second portions towards the first, relatively close, position.

A solenoid provides a simple and effective means of swiftly bringing the first and second portions closer to one another to move the brake caliper outboard.

In exemplary embodiments, the actuating arrangement has an inactive state and an active state; wherein, when the actuating arrangement is in the active state, the first and second portions are urged towards a first, relatively close, position to one another, and the brake caliper is urged towards a relatively outboard position; wherein one of the first and second portions is a threaded bolt, and the other of the first and second portions is a threaded nut configured to receive the threaded bolt, and wherein the actuating arrangement is configured such that, in the active state, relative rotation of the threaded bolt and the threaded nut urges the first and second portions towards the first, relatively close, position.

Relative rotation of the first and second portions provides a simple and effective means of moving the first and second portions, and so the brake caliper and brake carrier, in relation to one another by a predetermined distance.

In exemplary embodiments, the disc brake assembly further comprises a control system for operating the actuating arrangement, wherein the control system is configured to operate the actuating arrangement between an active state, where the brake caliper is urged towards a relatively outboard position, and an inactive state.

In exemplary embodiments, the control system is configured to operate the actuating arrangement to the active state following release of the disc brake assembly from a braking operation.

In exemplary embodiments, the control system is configured to operate the actuating arrangement to the inactive state upon initiation of a braking operation.

The provision of such a control system allows the actuating arrangement to be controlled depending on the state of the brake.

In exemplary embodiments, the disc brake assembly comprises a control system for operating the actuating arrangement, wherein the control system comprises a sensor for detecting a total potential running clearance between each of the first and second brake pads and the rotor.

Detecting the total potential running clearance allows the control system to set the distance by which the brake caliper is moved in an outboard direction accordingly, for example to ensure equal running clearance on either side of the rotor.

In exemplary embodiments, the disc brake assembly comprises a positive pad retraction arrangement for urging the first brake pad away from the rotor following a braking operation.

Providing a positive pad retraction arrangement helps to ensure that the brake pads are moved away from the rotor following a braking operation. The combination of positive pad retraction with the actuating arrangement helps to provide even running clearance on either side of the rotor, i.e., the brake pads being moved an equal distance from the rotor.

In exemplary embodiments, the positive pad retraction arrangement includes a biasing element.

The biasing element provides a simple and effective means of positive pad retraction.

There is also provided a method of moving the brake caliper of the disc brake assembly described above in an outboard axial direction in relation to the brake carrier by operating the actuating arrangement, the method comprising the steps of: releasing the disc brake assembly from a braking operation; and moving the actuating arrangement to an active state, where the brake caliper is in a relatively outboard position.

Moving the brake caliper in an outboard axial direction following a braking operation reduces the likelihood of inhibition of movement of the outboard brake pad in the outboard direction, i.e., away from the rotor. Advantageously, clearance between the outboard brake pad and the rotor is more easily achieved, reducing drag.

In exemplary embodiments, the method further comprises the step of, upon initiation of a braking operation, simultaneously moving the actuating arrangement to an inactive state, such that the brake caliper is slidable with respect to the brake carrier for clamping of the rotor by the brake pads.

In exemplary embodiments, the method further comprises the step of providing a sensor configured to detect total potential running clearance and determining a distance by which the brake caliper is to be moved based on the total potential running clearance.

Basing the predetermined distance upon the total potential running clearance between the brake pads and the rotor means that the running clearance can be optimized as desired.

BRIEF DESCRIPTION OF THE DRAWINGS

Embodiments will now be described, by way of example only, with reference to the accompanying figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
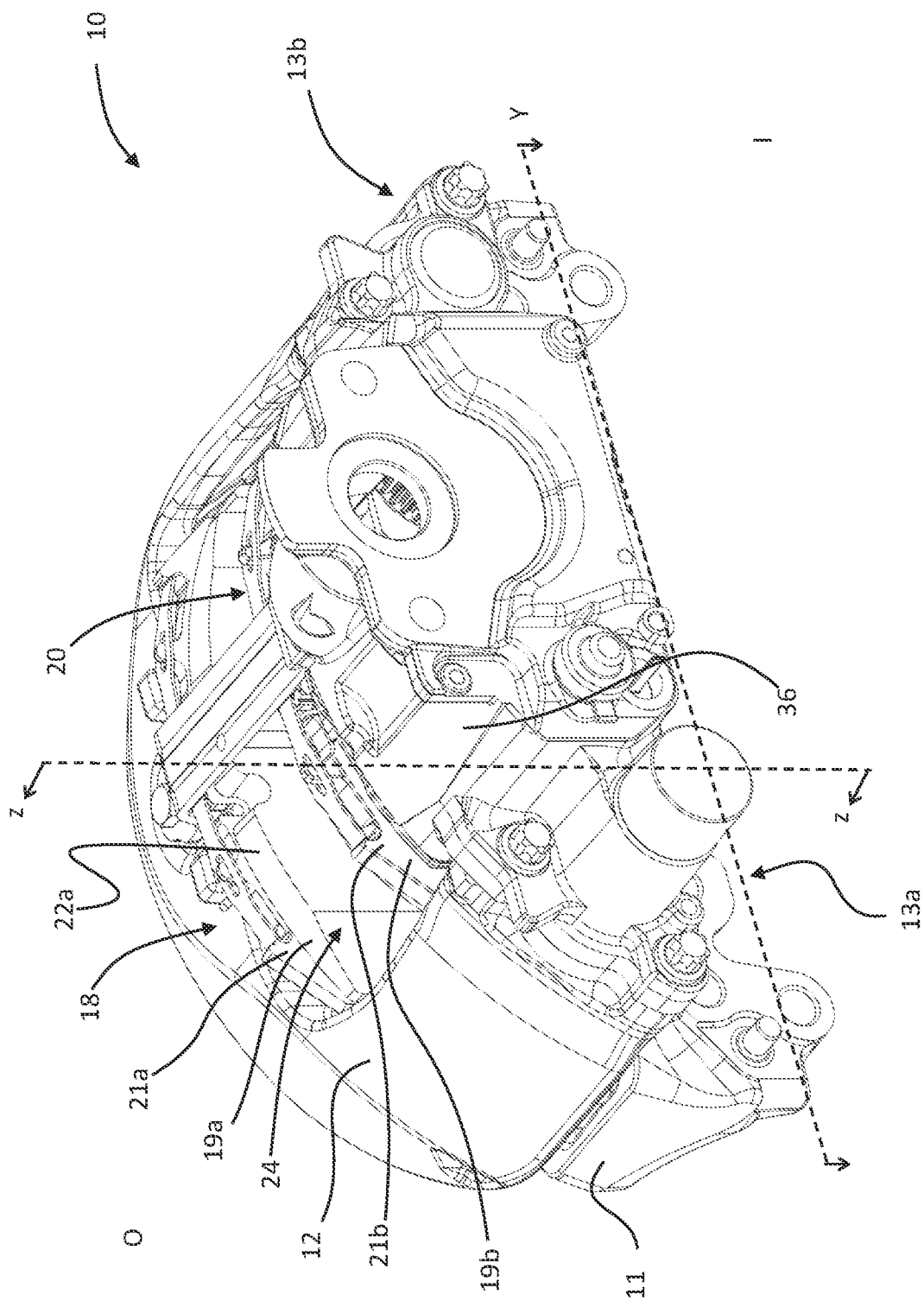
FIG. 1 is a perspective view of a disc brake assembly according to a first embodiment.

FIG. 1 shows a disc brake assembly 10 for a heavy commercial vehicle according to a first embodiment. The disc brake 10 includes a brake caliper 12 slidably mounted with respect to a brake carrier 11 by a first guide assembly 13a and a second guide assembly 13b.

In this embodiment, the guide assemblies 13a, 13b each have a guide pin 14 fixed to the carrier, and a guide bore 15 defined by the brake caliper 12. Each guide pin 14 is received in the respective guide bore 15 such that the brake caliper 12 is slidable in relation to the brake carrier 11.

The brake caliper 12 has a housing 36 typically formed from cast iron or steel. The brake carrier 11 is also typically formed from cast iron or steel.

The brake carrier 11 receives one or more brake pad assemblies 18, 20. In this embodiment, the brake carrier 11 receives first and second brake pad assemblies 18, 20. The first and second brake pad assemblies are an outboard brake pad assembly 18 and an inboard brake pad assembly 20. In other embodiments, however, the brake carrier 11 receives only one of the inboard brake pad assembly and the outboard brake pad assembly. For example, the outboard brake pad assembly is in some embodiments received in the brake caliper.

The outboard brake pad assembly 18 includes an outboard brake pad 19a having a back plate 21a that supports friction material 22a. The inboard brake pad assembly 20 has an inboard brake pad 19b having a back plate 21b which supports friction material 22b (see FIG. 2).

Figure 2:
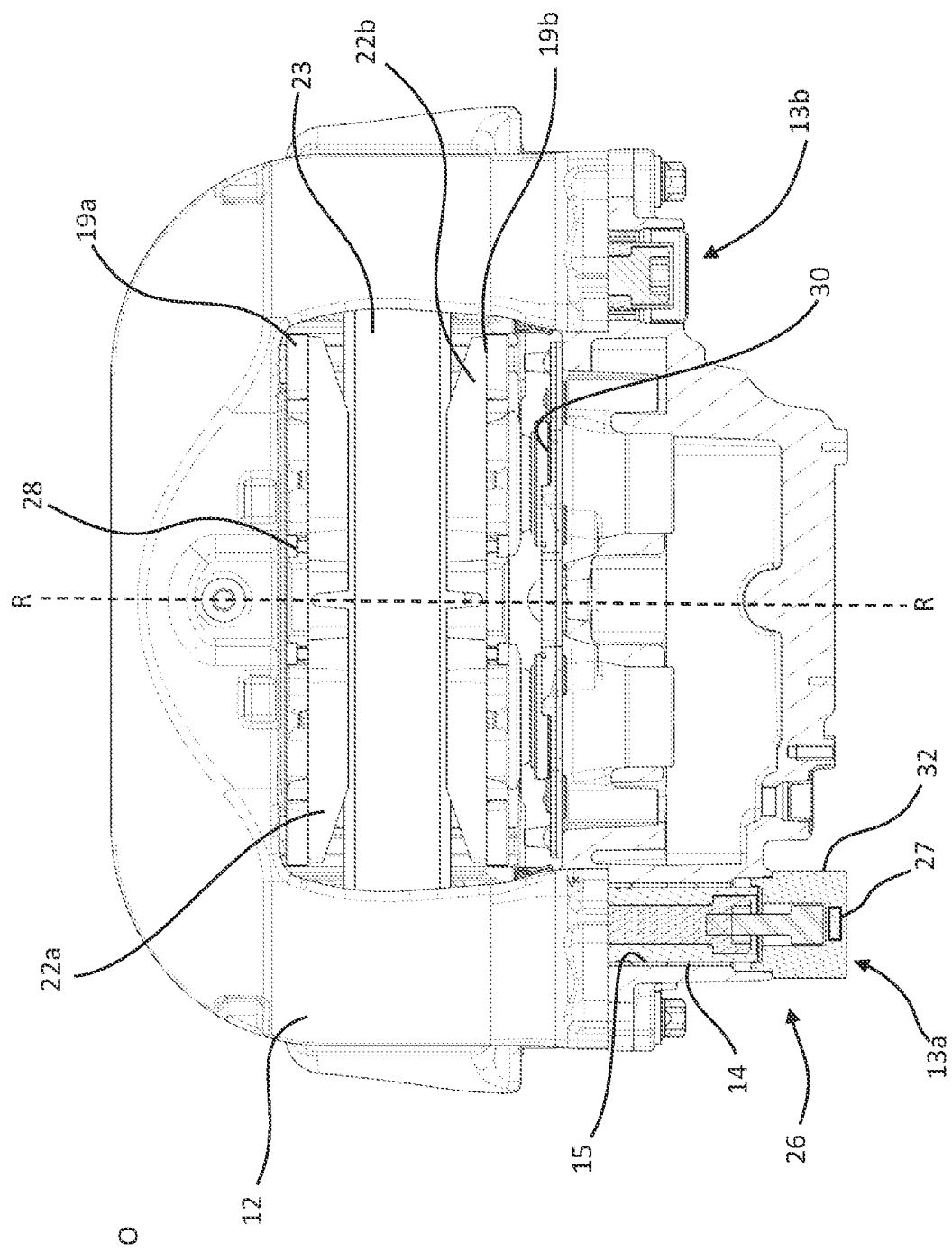
FIG. 2 is a partial cross-sectional plan view of the disc brake assembly of FIG. 1.

With reference to FIG. 2, a rotor 23, rotatable about a central axis R-R extending in an inboard-outboard axial direction, is rotatably fixed relative to a hub of the wheel of the vehicle (not shown) and positioned between the outboard brake pad assembly 19a and the inboard brake pad assembly 19b. An air actuator (not shown) is provided to move the inboard brake pad assembly 19b towards the rotor 23 during a braking operation via an actuation mechanism (not shown), such that the friction material 22b of the inboard brake pad 19b is brought into frictional contact with the rotor 23.

During a braking operation, when the friction material 22b contacts the rotor 23, a reaction force causes the brake caliper 12 to slide in the inboard axial direction along the first and second guide assemblies 13a, 13b. As the brake caliper 12 slides inboard, the brake caliper 12 moves the outboard brake pad 19a inboard, i.e., towards the rotor 23, via a contact pad 28. The friction material 22a of the outboard brake pad 19a is thus brought into frictional contact with the rotor 23. The rotor 23 is clamped between the inboard brake pad assembly 20 and the outboard brake pad assembly 18 and rotation of the rotor 23 is frictionally inhibited, causing the vehicle to slow down.

The brake caliper 12 defines an aperture 24 through which the outboard brake pad assembly 18 and the inboard brake pad assembly 20 can be installed and removed in a radial direction, with the rotor in place.

During a braking operation, it is desirable for the outboard brake pad 19a and the inboard brake pad 19b to be located equidistant from the rotor 23, in order to promote even wear of the outboard brake pad 19a and the inboard brake pad 19b and both sides of the rotor 23 over the life of disc brake assembly 10. As the friction material 22a, 22b and the rotor 23 wear over the life of the disc brake assembly 10, an adjustment mechanism (well-known and not described in detail) is configured to advance the inboard brake pad 19b towards the rotor 23 during a braking operation if the clearance between the inboard brake pad 19b and the rotor 23 is greater than desired. Adjustment occurs until the friction material 22b of the inboard brake pad 19b contacts the surface of the rotor 23, at which point the adjustment is stopped. When the disc brake assembly 10 is released at the end of the braking operation, the outboard brake pad 19a and the inboard brake pad 19b can move away from the rotor 23, such that there is an inboard pad clearance between the inboard friction material 22b and the rotor 23, and an outboard pad clearance between the friction material 22a and the rotor 23.

The disc brake assembly 10 has an actuating arrangement 26 (see FIGS. 2 and 3) for moving the brake caliper 12 in the outboard axial direction in relation to the brake carrier 11. Following the release of the disc brake 10 after a braking operation, the actuating arrangement 26 is used to move the brake caliper 12 in an outboard direction in relation to the brake carrier 11. This allows the outboard brake pad 19a to move in the outboard direction, i.e., away from the rotor 23, without obstruction by the brake caliper 12.

The actuating arrangement 26 is arranged to move the brake caliper 12 in an outboard direction by a pre-determined distance to a relatively outboard position. This allows control over the running clearance of the disc brake 10, as follows.

Figure 3:
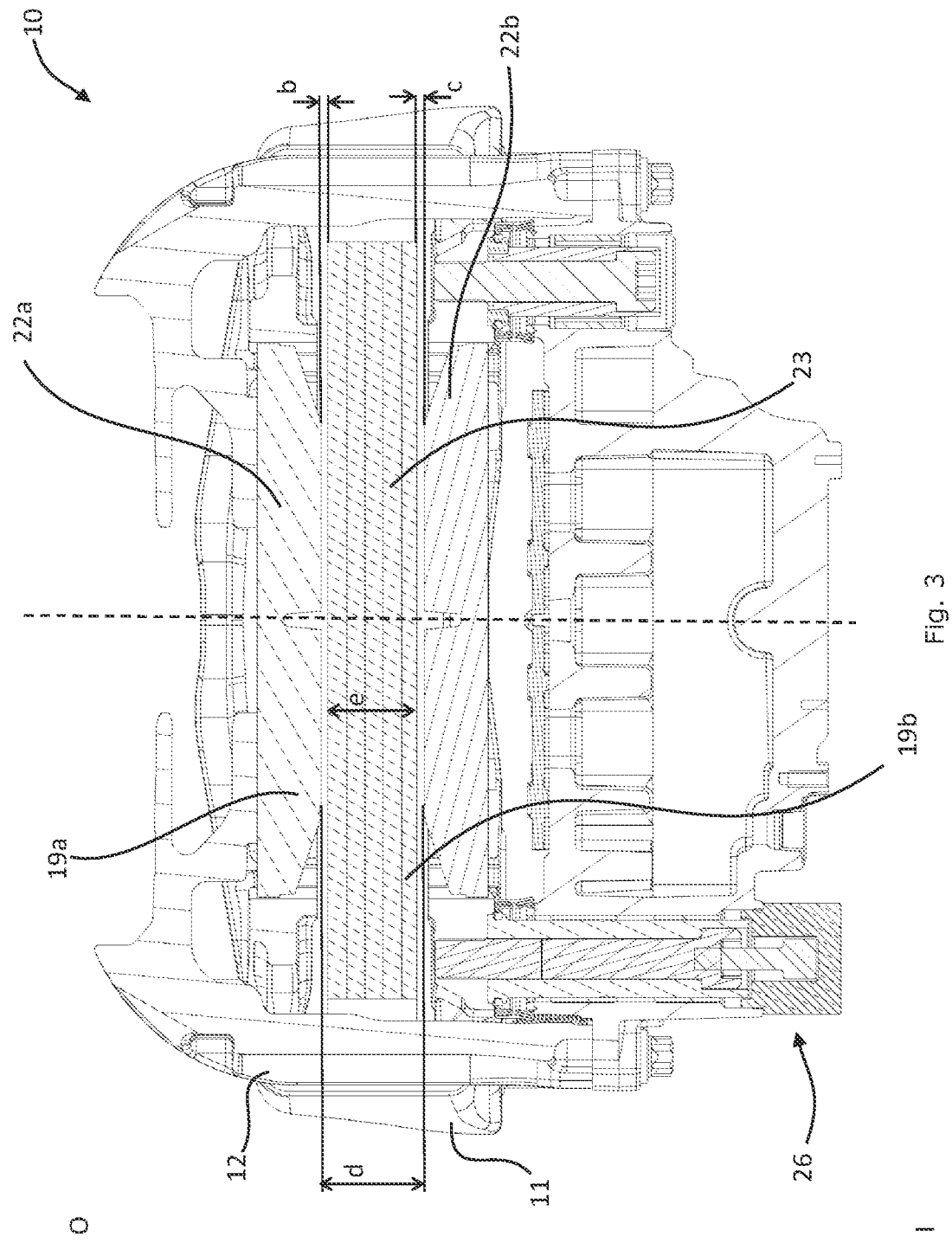
FIG. 3 is a cross-sectional view through the disc brake assembly of FIG. 1 along the line Y:Y.

As shown in FIG. 3, when the disc brake 10 is not applied, the disc brake 10 has a total potential running clearance b+c, i.e., the total of the running clearance b between the outboard friction material 22a and the rotor 23, and the running clearance c between the inboard friction material 22b and the rotor 23. This total potential running clearance b+c is calculated when the outboard brake pad 19a is moved as far as possible in the outboard direction, and the inboard brake pad 19b is moved as far as possible in the inboard direction.

In this embodiment, as described in further detail below, a positive pad retraction system (not shown) urges each brake pad, 19a, 19b in the respective direction away from the rotor 23, in order to maximize running clearance. In an alternative embodiment, where the outboard brake pad is secured to the brake caliper, the outboard brake pad is moved away from the rotor with the brake caliper as the brake caliper is moved in the outboard direction. Movement of the outboard brake pad 19a in the outboard direction is limited by the contact pad 28 on the brake caliper 12. Movement of the inboard brake pad 19b in the inboard direction is limited by a tappet 30 that forms part of the actuation mechanism during a braking operation.

Total potential running clearance between each of the first and second brake pads 19a, 19b and the rotor 23 is therefore calculated as being the distance between the contact pad 28 and the tappet 30, minus the widths of the brake pads 19a, 19b, minus the width e of the rotor.

The actuating arrangement 26 is in this embodiment arranged to move the brake caliper 12 by a distance that is determined based on the total potential running clearance b+c. In this embodiment, the pre-determined distance is substantially half of the total potential running clearance b+c, so that b is substantially the same as c, and equal running clearance is provided on either side of the rotor 23. This advantageously reduces the risk of drag, as each running clearance b, c on each side of the rotor 23 is as wide as possible, reducing the likelihood of one or the other of the brake pads 19a, 19b coming into inadvertent contact with the rotor 23.

Figure 4:
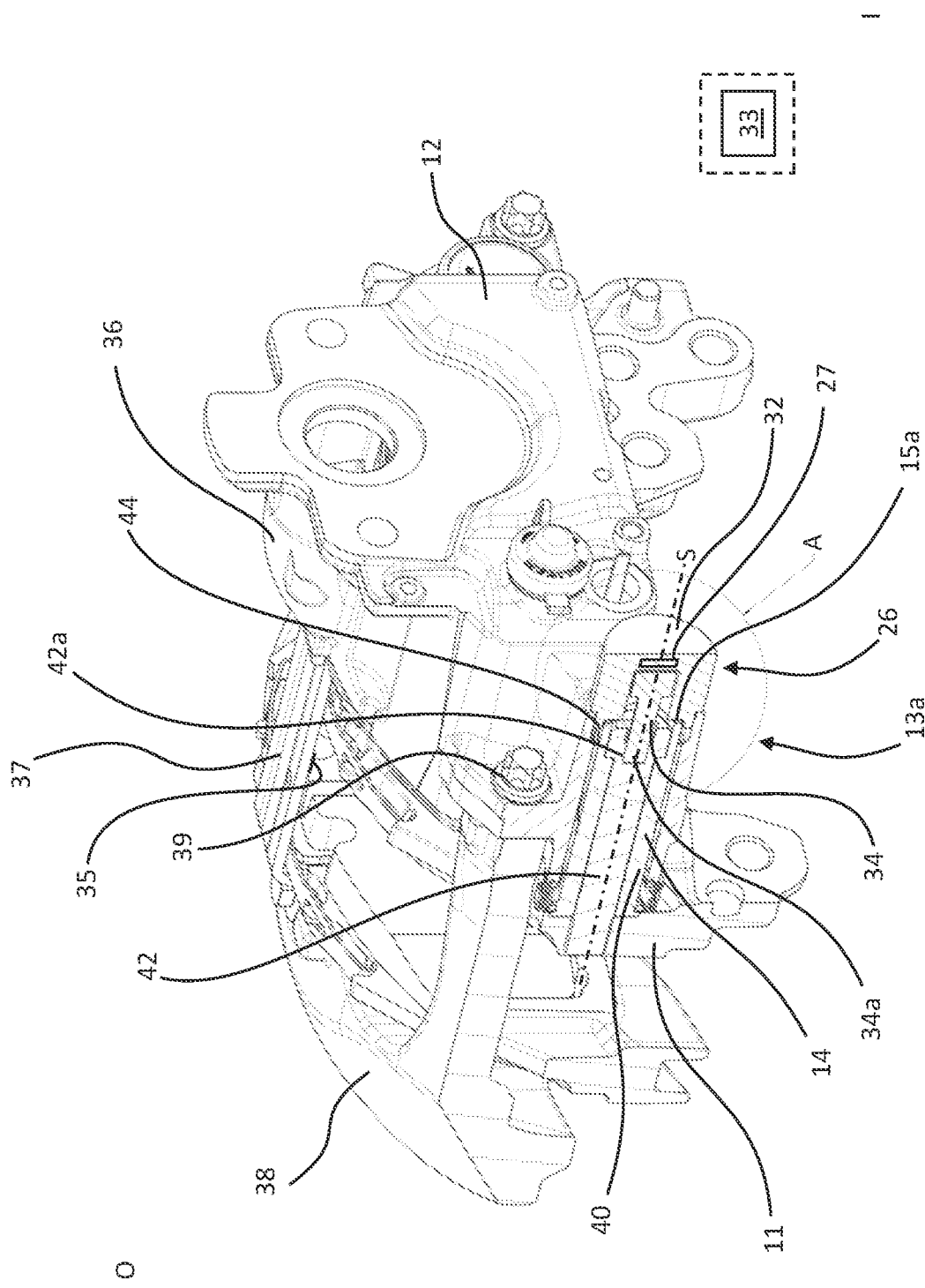
FIG. 4 is a cross-sectional view through the disc brake assembly of FIG. 1 along the line Z:Z.
Figure 5:
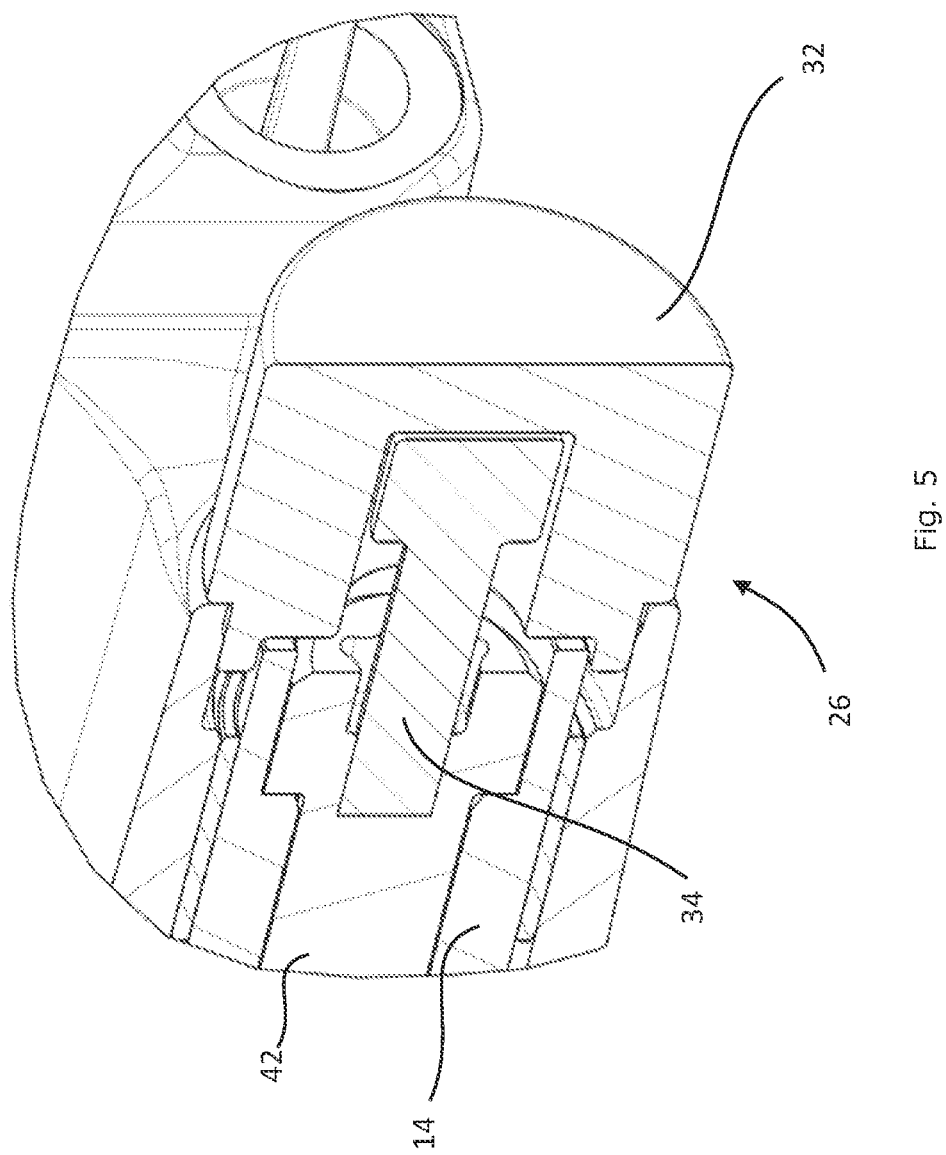
FIG. 5 is a detailed view A of FIG. 4.

With reference now to FIGS. 4 and 5, the actuating arrangement 26 is shown in further detail. The actuating arrangement 26 has a first portion 32 secured to the brake caliper 12 and a second portion 34 secured to the brake carrier 11. Movement of the first and second portions 32, 34 in relation to one another results in movement of the brake caliper 12 in relation to the brake carrier 11.

The brake caliper 12 has a housing 36 and a bridge 38. The bridge 38 extends over the rotor 23 and provides the contact pad 28 by which the outboard brake pad 19a is urged towards the rotor 23 upon application of the disc brake 10. The bridge 38 is secured to the housing 36, in this embodiment by fasteners 39, and in alternative embodiments by some other suitable means of attachment. The bridge 38 thus moves with the housing 36. Movement of the housing 36 in the outboard direction thus leads to movement of the bridge 38 in the outboard direction, as the two components move with one another.

In this embodiment, the first portion 32 is secured to the housing 36. In this embodiment, the first portion 32 is secured to the guide bore 15, as described in further detail below. In this embodiment, the second portion 34 of the actuating arrangement 26 is secured to the guide pin 14 of the first guide assembly 13a.

The guide bore 15 defines a longitudinal inboard-outboard axis S extending parallel to the central axis R of the rotor 23. Movement of the first and second portions 32, 34 in relation to one another takes place along the axis S, so that the resulting movement of the brake caliper 12 in relation to the brake carrier 11 takes place in the inboard-outboard direction substantially parallel to the axes R, S.

In this embodiment, the guide pin 14 has a guide sleeve 40 secured to the brake carrier 11 by a fastener or guide bolt 42. The second portion 34 is secured to the guide bolt 42. In an alternative embodiment, the second portion 34 is secured to the guide sleeve 40. In an alternative embodiment, the first guide assembly has an alternative type of guide pin to which the second portion is attached, such as a monolithic guide pin.

Locating the actuating arrangement 26 at the guide assembly 13a advantageously limits the number of additional components in the disc brake assembly 10. In addition, suitable space is available at the guide assembly 13a for the actuating arrangement 26, so that inclusion of the actuating arrangement 26 in the disc brake assembly 10 does not overly increase the complexity or the size of the disc brake assembly 10.

In this embodiment, the disc brake assembly 10 has a single actuating arrangement 26. In an alternative embodiment, an actuating arrangement 26 is provided at the second guide assembly 13b only. In an alternative arrangement, an actuating arrangement 26 is provided at both guide assemblies 13a, 13b.

The first portion 32 is shaped to provide a cap that covers an open end 15a of the guide bore and advantageously inhibits contamination of the guide bore 15. The first portion 32 is fitted to the open end 15a of the guide bore 15. In this embodiment, the first portion 32 is received in the open end 15a in a push fit, providing a simple means of securing the first portion 32 to the guide bore 15. In this embodiment, the first portion 32 has a projection 44 which extends into the open end 15a and which forms a push fit with the open end 15a. In an alternative embodiment, some other suitable means of fixing the first portion 32 to the guide bore 15 is provided. For example, in one embodiment, the open end and the first portion have complimentary threads. In an alternative embodiment, a suitable adhesive is used.

The second portion 34 extends within the first portion 32, i.e., the second portion 34 is at least partially surrounded by the first portion 32. An end 34a of the second portion 34 is secured to the guide bolt 42. In this embodiment, the end 34a is threaded, and extends into and is secured by a corresponding threaded aperture 42a of the guide bolt 42. In an alternative embodiment, some other type of suitable fastening is used.

In an alternative embodiment, the first portion is attached to some other suitable part of the brake caliper. In an alternative embodiment, the second portion is attached to some other suitable part of the brake carrier.

The actuating arrangement 26 has an active state and an inactive state. When the actuating arrangement 26 is in the active state, and no braking operation is underway, the first and second portions 32, 34 are moved to a position relatively close to one another, so that the brake caliper 12 is moved to the relatively outboard position. When no braking force is applied, the brake caliper is held in the relatively outboard position. Unwanted sliding of the brake caliper 12 in an inboard direction, e.g., upon the vehicle cornering or due to engine vibration, is inhibited.

When the actuating arrangement 26 is in the inactive state, the first and second portions 32, 34 are not held relatively close to one another, but are able to move in relation to one another such that the first portion 32 and so the brake caliper 12 can be moved inboard from the relatively outboard position. The brake caliper 12 can be used to apply a braking force to the rotor 23 via the outboard brake pad 19a.

In FIGS. 2 and 3, the actuating arrangement 26 is in the active state, such that the brake caliper 12 is in a relatively outboard position in relation to the brake carrier 11, and running clearance b, c can be created between each brake pad 19a, 19b and the rotor 23.

Operation of the actuating arrangement 26 to the active state is carried out by electro-mechanical means, i.e., by mechanical movement that is electrically controlled.

In this embodiment, the actuating arrangement 26 includes a solenoid 27 by which the actuating arrangement 26 is operated to the active state. The strength of the magnetic field generated is adjusted to adjust the distance by which the actuating arrangement 26 moves the brake caliper 12. In an alternative embodiment, pulse variation is used to adjust the distance by which the actuating arrangement moves the brake caliper, e.g., variation in the number and length of pulses.

In this embodiment, the first portion 32 includes the solenoid 27. The second portion 34 is of, or is at least partially of, magnetic material, or includes a magnetic component, so that activation of the solenoid 27 draws the first portion 32 towards the second portion 34, resulting in movement of the brake caliper 12 in the outboard direction. In an alternative embodiment, the solenoid is included in the second portion 34, and the first portion 32 is of, or is at least partially of, magnetic material, or includes a magnetic component.

Operation of the actuating arrangement 26 to the inactive state is carried out by deactivation of the solenoid 27. Deactivation of the solenoid 27 releases the first and second portions 32, 34 from one another, and so allows movement of the brake caliper 12 in the inboard direction.

In an alternative embodiment, not shown, one of the first and second portions is a threaded bolt, and the other of the first and second portions is a threaded nut, and defines a threaded aperture for receiving the threaded bolt. Operation of the actuating arrangement to an active state in such an embodiment is brought about by relative rotation of the threaded bolt and threaded aperture, e.g., by an electric motor, in such a direction so as to bring the first and second portions closer together, i.e., to the relatively close position, such that the brake caliper is moved outboard. The amount of relative rotation dictated by the pre-determined distance by which the brake caliper is required to be moved in the outboard direction. Upon operation of the actuating arrangement to the inactive state, relative rotation is allowed such that the brake caliper can move or can be moved in an inboard direction in relation to the brake caliper.

In alternative embodiments, alternative actuating arrangements are provided. For example, in one embodiment, the actuating arrangement includes piezo-electric material arranged to alter in shape upon the application of an electric current, and so move the brake caliper in the outboard direction. In one embodiment, the actuating arrangement includes air actuation or fluid actuation.

The disc brake assembly 10 includes a control system 33 for operating the actuating arrangement 26 between the active and inactive states. The control system 33 is indicated schematically in FIG. 2. The disc brake assembly 10 includes a running clearance sensor 35 for detecting total potential running clearance. The control system 33 selects the pre-determined distance based on information from the running clearance sensor 35 and adapts relative movements of the first and second portions 32, 34 accordingly, in a closed loop system.

In this embodiment, the running clearance sensor 35 is located on the underside of a pad strap 37 used to secure the brake pads 19a, 19b. In this location the running clearance sensor 35 is able to detect the total potential running clearance b+c.

In alternative embodiments, the running clearance sensor is located elsewhere. In an alternative embodiment, the running clearance sensor is located within the housing 36, and is configured to detect running clearance via the stroke of the brake pistons or the guide sleeve position.

In an alternative embodiment, the predetermined distance is fixed according to the geometry of the brake and known likely total potential running clearance. For example, where the known total potential running clearance is likely to be 0.8 mm, the predetermined distance is set at 0.4 mm, or at 0.5 mm, to ensure that running clearance is provided on either side of the rotor.

In use, operation of the actuating arrangement 26 to the active state takes place upon the release of the disc brake following a braking operation, so that the brake caliper 12 is moved in the outboard direction as soon as possible following release of the brake.

When a braking operation is to take place, movement of the brake caliper 12 in the inboard direction is required. Upon initiation of a braking operation, therefore, the actuating arrangement 26 is operated to the inactive state, so that the brake caliper 12 can be moved inboard relative to the brake carrier 11. In an alternative embodiment, rather than operation of the actuating arrangement to the inactive state, the braking force applied is sufficient to override the active state of the actuating arrangement, e.g., the strength of the solenoid is such that it can be overcome by a braking operation. In such an embodiment, the actuating arrangement 26 remains in the active state, so that upon release of the disc brake assembly 10 at the end of the braking operation, the brake caliper 12 is moved in an outboard direction by the actuating arrangement 26. In such an embodiment, the actuating arrangement 26 can be in the active state at all times when the vehicle is functioning.

As stated above, the disc brake assembly 10 includes a positive pad retraction arrangement for urging the first and second brake pads 19a, 19b away from the rotor 23. The actuating arrangement 26 aids the positive pad retraction arrangement by ensuring that the brake caliper 12 does not inhibit movement of the outboard brake pad 19a away from the rotor 23. Setting a pre-determined distance by which retraction of the outboard brake pad can take place advantageously allows running clearance to be adjusted to be equal on both sides of the rotor 23.

Although described above in relation to a guide assembly where the brake caliper defines guide bores configured to receive guide pins secured to a brake carrier, the actuation arrangement is suitable for use with a guide assembly where a guide pin or pins secured to a brake caliper are received in a guide bore or guide bores defined by a brake carrier.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake assembly for a vehicle, the disc brake assembly comprising:
   first and second brake pads operable to contact a rotor during a braking operation to slow the vehicle, the rotor having a central axis defining an inboard-outboard axial direction;
   a brake carrier that receives at least the first brake pad;
   a brake caliper arranged to slide with respect to the brake carrier in the inboard-outboard axial direction to clamp and release of the rotor by the first and second brake pads; and
   an actuating arrangement that selectively moves the brake caliper in an outboard axial direction in relation to the brake carrier, wherein the actuating arrangement comprises a first portion secured to the brake caliper and a second portion that is fixedly positioned with respect to the brake carrier, and the first portion and the second portion are disposed outside the brake carrier;
   wherein the actuating arrangement is electrically operated, wherein the actuating arrangement is configured to move the brake caliper by a predetermined distance, wherein, when no braking operation is taking place, the disc brake assembly has a total potential running clearance between each of the first and second brake pads and the rotor, and wherein the predetermined distance is related to the total potential running clearance.

2. The disc brake assembly of claim 1 wherein the predetermined distance is substantially half of the total potential running clearance.

3. The disc brake assembly of claim 1 wherein the actuating arrangement is configured to move the first and second portions in relation to one another so as to effect movement of the brake caliper in relation to the brake carrier.

4. The disc brake assembly of claim 3 further comprising a first caliper guide assembly configured to slidably support the brake caliper on the brake carrier, wherein the first caliper guide assembly comprises a first guide pin secured to the brake carrier and a first guide bore defined by the brake caliper and configured to slidably receive the first guide pin, and wherein the second portion is secured to the first guide pin.

5. The disc brake assembly of claim 4 wherein the first guide pin comprises a guide sleeve that slidably supports the brake caliper, and a fastener for securing the guide sleeve to the brake carrier, and wherein the second portion is secured to the guide sleeve, or wherein the second portion is secured to the fastener.

6. The disc brake assembly of claim 4 wherein the first portion extends at least partially within the first guide bore.

7. The disc brake assembly of claim 6 wherein the first portion is secured to the first guide bore by a push-fit arrangement.

8. The disc brake assembly of claim 7 wherein the first caliper guide assembly further comprises a cap that closes an opening of the first guide bore, and wherein the cap comprises the first portion.

9. The disc brake assembly of claim 3 wherein the actuating arrangement has an inactive state and an active state, wherein, when the actuating arrangement is in the active state, the first and second portions are urged towards a first, relatively close, position to one another, and the brake caliper is urged towards a relatively outboard position, wherein the actuating arrangement comprises a solenoid configured to move the first and second portions to the first, relatively close, position, and wherein, when the actuating arrangement is in the active state, the solenoid is activated, so as to urge the first and second portions towards the first, relatively close, position.

10. The disc brake assembly of claim 3 wherein the actuating arrangement has an inactive state and an active state, wherein, when the actuating arrangement is in the active state, the first and second portions are urged towards a first, relatively close, position to one another, and the brake caliper is urged towards a relatively outboard position, wherein one of the first and second portions is a threaded bolt, and the other of the first and second portions is a threaded nut configured to receive the threaded bolt, and wherein the actuating arrangement is configured such that, in the active state, relative rotation of the threaded bolt and the threaded nut urges the first and second portions towards the first, relatively close, position.

11. The disc brake assembly of claim 1 further comprising a control system for operating the actuating arrangement, wherein the control system is configured to operate the actuating arrangement between an active state, where the brake caliper is urged towards a relatively outboard position, and an inactive state.

12. The disc brake assembly of claim 11 wherein the control system is configured to operate the actuating arrangement to the active state following release of the disc brake assembly from the braking operation.

13. The disc brake assembly of claim 12 wherein the control system is configured to operate the actuating arrangement to the inactive state upon initiation of the braking operation.

14. The disc brake assembly of claim 1 further comprising a control system that operates the actuating arrangement, wherein the control system comprises a sensor that detects the total potential running clearance between each of the first and second brake pads and the rotor.

15. The disc brake assembly of claim 1 further comprising a positive pad retraction arrangement that urges the first brake pad away from the rotor following the braking operation.

16. The disc brake assembly of claim 15 wherein the positive pad retraction arrangement includes a biasing element.

17. The disc brake assembly of claim 1 wherein the first portion of the actuating arrangement is disposed at a first end of a first guide bore of the brake caliper that is disposed opposite the brake carrier.

18. A method of moving a brake caliper of a disc brake assembly in an outboard axial direction in relation to a brake carrier by operating an actuating arrangement, the method comprising the steps of:
providing the actuating arrangement in which the actuating arrangement has a first portion secured to the brake caliper, and a second portion secured to the brake carrier, and wherein the actuating arrangement is configured to move the first and second portions in relation to one another so as to effect movement of the brake caliper in relation to the brake carrier, the actuating arrangement having an inactive state and an active state, wherein the first and second portions are urged toward a first position by a solenoid and the brake caliper is urged toward a relatively outboard position when in the active state;
releasing the disc brake assembly from a braking operation;
moving the actuating arrangement to the active state;
upon initiation of the braking operation, simultaneously moving the actuating arrangement to the inactive state such that the brake caliper is slidable with respect to the brake carrier; and
providing a sensor configured to detect a total potential running clearance and determining a distance by which the brake caliper is to be moved based on the total potential running clearance.

19. A disc brake assembly for a vehicle, the disc brake assembly comprising:
first and second brake pads operable to contact a rotor during a braking operation to slow the vehicle, the rotor having a central axis defining an inboard-outboard axial direction;
a brake carrier that receives at least the first brake pad;
a brake caliper arranged to slide with respect to the brake carrier in the inboard-outboard axial direction to clamp and release of the rotor by the first and second brake pads;
an actuating arrangement that selectively moves the brake caliper in an outboard axial direction in relation to the brake carrier;
wherein the actuating arrangement is electrically operated, wherein the actuating arrangement is configured to move the brake caliper by a predetermined distance, wherein, when no braking operation is taking place, the disc brake assembly has a total potential running clearance between each of the first and second brake pads and the rotor, and wherein the predetermined distance is related to the total potential running clearance; and a control system that operates the actuating arrangement, wherein the control system comprises a running clearance sensor that detects the total potential running clearance between each of the first and second brake pads and the rotor, wherein the control system sets the predetermined distance based on information from the running clearance sensor.

20. The disc brake assembly of claim 19 wherein the actuating arrangement comprises a first portion secured to the brake caliper and a second portion that is fixedly positioned with respect to the brake carrier, and the first portion and the second portion are disposed outside the brake carrier.

* * * * *